A. C. BROWNLICH.

Mowing Machine.

No. 2,582. Reissued April 30, 1867.

Witnesses

W. C. Doeg

R. D. C. Pruitt

Inventor

C. Wheiler, Jr

N. PETERS, Photo-Lithographer, Washington, D. C.

United States Patent Office.

CYRENUS WHEELER, JR., OF POPLAR RIDGE, NEW YORK, ASSIGNEE BY MESNE ASSIGNMENTS OF A. C. BROWNLICH.

*Letters Patent No.* 22,483, *dated January* 4, 1859; *reissue No.* 2,582, *dated April* 30, 1867.

DIVISION A.

IMPROVEMENT IN HARVESTERS.

The Schedule referred to in these Letters Patent and making part of the same.

TO ALL WHOM IT MAY CONCERN:

Be it known that A. C. BROWNLICH, of Buffalo, in the State of New York, invented certain new and useful Improvements in Harvesters; and I do hereby declare that the following is a full and exact description of the construction and operation thereof, reference being had to the accompanying drawings and the letters of reference marked thereon, in which—

Figure 1:
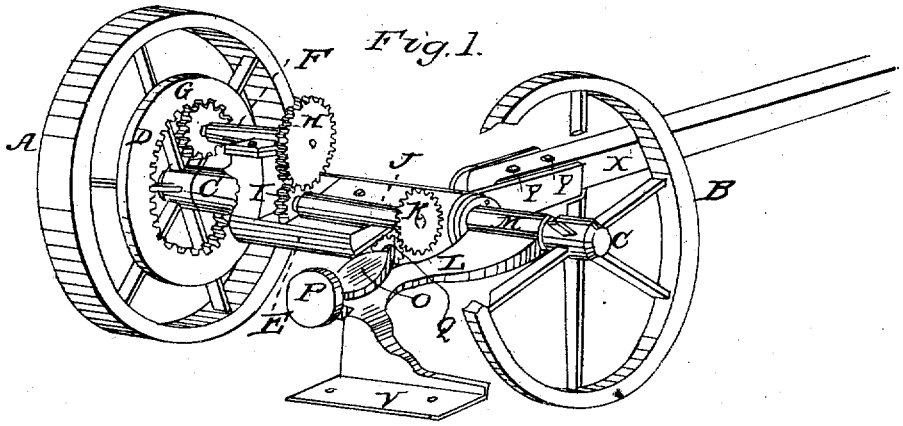

Figure 1 is a perspective view of the machine.

Figure 2:
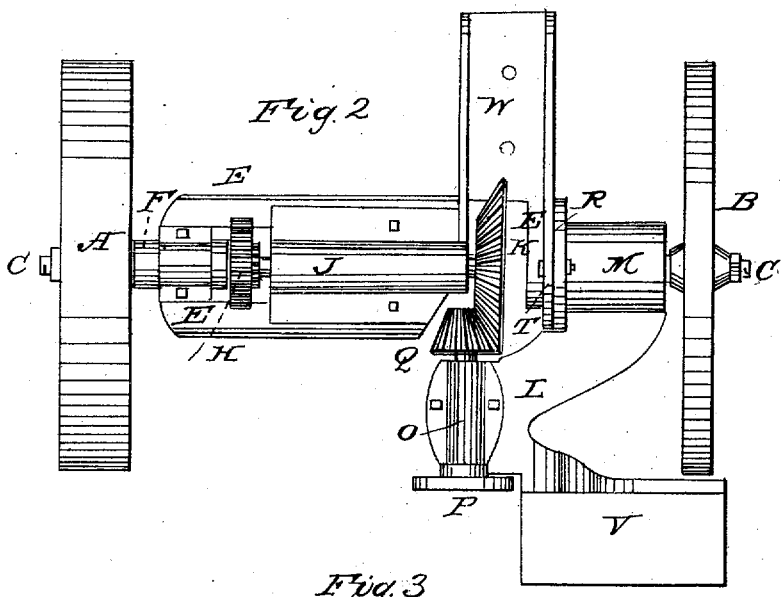

Figure 2, a plan or top view; and

Figure 3:
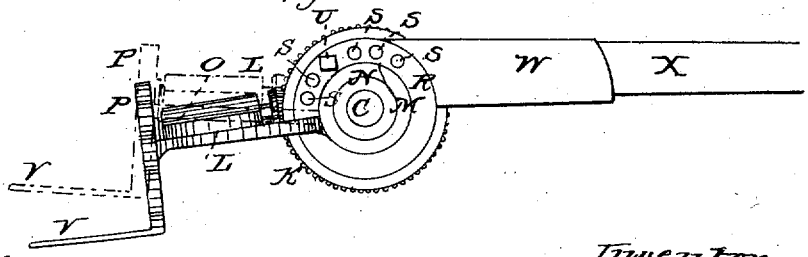

Figure 3 is a side elevation, showing by section the connection of the second frame.

Similar letters, where they appear in the several figures, indicate corresponding parts.

The invention consists, first, in the employment in a two-wheel machine of a frame carrying the cutting apparatus, arranged to vibrate about a centre coincident with the centre of rotation of a bevel-wheel which is mounted on an axis parallel with, but independent of, the main driving-wheel axle; second, in the combination in a two-wheel machine of a vibrating frame carrying the crank-shaft and pinion, with a frame carrying the bevel-wheel, mounted on an axis independent of the main driving-wheel axle in such manner that the axis of rotation of said bevel-wheel and the axis of oscillation of the vibrating frame shall coincide; third, in so connecting a vibrating frame, carrying a crank-shaft and pinion, with the frame carrying the bevel-wheel mounted on an axle independent of the main gear-wheel, as that the axis of oscillation of said vibrating frame shall coincide with the axis of rotation of the two supporting-wheels, the main gear-wheel, and the bevel-wheel, as hereinafter described.

To enable others skilled in the art to construct and use the invention I will proceed to describe the same.

A is one of the supporting-wheels, B is the other, which are so fitted as to revolve freely on axles C. With the supporting-wheel A is connected gear-wheel D so as to revolve with it. In suitable bearings F on the frame E is mounted a shaft-carrying pinion, G, gearing with gear-wheel D, the other end of the shaft carrying spur-wheel H, gearing with pinion I. This pinion I is mounted on one end of a shaft, and is supported on the frame E by suitable bearings, J, the other end of the shaft carrying bevel-wheel K. This bevel-wheel K gears with pinion Q, imparting motion to it when in operation. L is a second frame, having a sleeve, M, for connecting it to the frame E by boss N, (see fig. 3,) on which it can freely turn. The centre of the boss N and the centre of the shaft on which the bevel-wheel K is mounted are in line or coincide with each other. On the frame L is mounted a crank-shaft, supported by suitable bearings O, to one end of which is fastened bevelled pinion Q, which gears with bevel-wheel K. To the other end is fastened the crank-head P. The rear end of frame L has a shoe or flange, V, to which the finger-bar is bolted. The sleeve M has a collar, R, connected with it, having a series of holes, S, and a corresponding flange, T, of the frame E, has also a corresponding series of holes. By inserting bolt U in these holes the frame L can be restrained in its motions and the cutting apparatus connected therewith sustained above the ground for the purpose of transportation or cutting the crop at different heights. A recess, W, is formed with the frame E. To this is bolted the tongue X by bolts Y.

Having described its construction, its mode of operation is as follows: The progressive movement of the machine over the ground imparts a rotary motion to gear-wheel D, which in turn gives motion to pinion G and spur-wheel H, which in turn give motion to pinion I and bevel-wheel K, the bevel-wheel K imparting to pinion Q on the crank-shaft the motion it receives from the other gearing. The frame L being free to oscillate on the boss N, rises and falls at its other end, independent of the movements of the first frame, and is therefore left free, with the cutting apparatus connected with it, to follow the surface of the ground. To restrain the motion of frame L the operator can insert a bolt in one of the series of holes S, thereby locking the frames L and E together, one of which positions is shown in red lines in fig. 3. It will be seen that the connection of the frame L with with the frame E is such that in its vibration the cones of the teeth of the bevel-pinion Q and the cones of the teeth of the bevel-wheel K must at all times coincide.

Having described one practical way in which this branch of the invention can be carried out, it is not deemed necessary to show how the improvement can be applied to other machines in use, as the ordinary skill of the constructor is sufficient for the purpose.

What I claim as new, and desire to secure by Letters Patent, is—

1. In a two-wheel machine, a frame carrying the cutting apparatus, arranged to vibrate about a centre coincident with the centre of rotation of a bevel-wheel which is mounted on an axis parallel with, but independent of, the main drive-wheel axle.

2. The combination in a two-wheel machine of a vibrating frame, carrying the crank-shaft and pinion, with a frame carrying the bevel-wheel mounted on an axis independent of the main drive-wheel axle in such manner that the axis of rotation of said bevel-wheel and the axis of oscillation of the vibrating frame shall coincide.

3. So connecting a vibrating frame carrying a crank-shaft and pinion with the frame carrying the bevel-wheel mounted on an axle independent of the main gear-wheel, as that the axis of oscillation of said vibrating frame shall coincide with the axis of rotation of the two supporting-wheels, the main gear-wheel, and the bevel-wheel, substantially as described.

C. WHEELER, Jr.

Witnesses:
S. J. Bowen,
H. Underhill.